Dunniway & Osborne,
Mill Stone Dress.
No. 105,186. Patented July 12. 1870.

Witnesses:
Gustave Dietrich
S. D. Mabee.

Inventor:
W. G. Dunniway
H. Osborne
Per Munn & Co.
Attorneys.

United States Patent Office.

WILLIAM G. DUNNIWAY AND HARRISON OSBURN, OF NEW CUMBERLAND, INDIANA.

Letters Patent No. 105,186, dated July 12, 1870.

IMPROVEMENT IN MILLSTONE-DRESS.

The Schedule referred to in these Letters Patent and making part of the same.

*To all whom it may concern:*

Be it known that we, WILLIAM G. DUNNIWAY and HARRISON OSBURN, of New Cumberland, in the county of Grant and State of Indiana, have invented a new and improved Millstone-Dress; and we do hereby declare that the following is a full, clear, and exact description thereof, which will enable others skilled in the art to make and use the same, reference being had to the accompanying drawing forming part of this specification.

This invention relates to improvements in "dress" for burr millstones, and consists in making the leading furrow, from the eye to the intersection of the short furrow, about double the width that it or the short furrow is from the intersection outward, where they are of about the ordinary width, whereby the furrow capacity is made uniform from the eye to the skirt, very greatly increasing the ventilation and increasing the grinding capacity.

Similar letters of reference indicate corresponding parts.

A represents the leading furrow, extending from the eye to the skirt, and B is the short diagonal furrow, beginning at the skirt at the center of the space between the said leading furrow A and the succeeding one, A', and extending parallel with the latter to the junction with the first, at C.

From this point to the eye the two form one broad furrow, E, extending to the eye in the line of the furrow A, except at the corner D, which is cut off by the next leading furrow.

Figure 1:
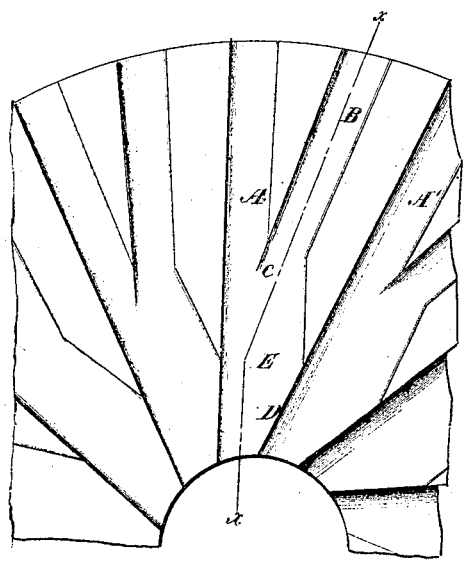
Figure 1 is a face view of a part of a stone having our improved dress.
Figure 3:
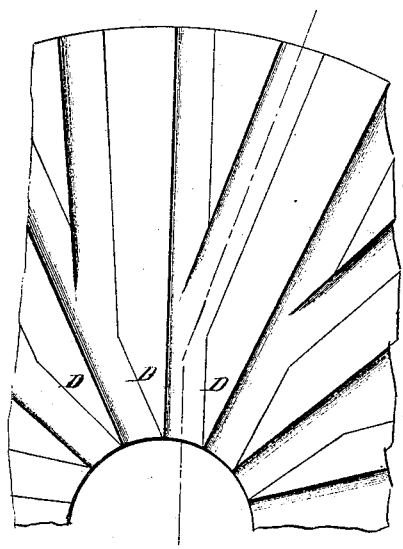
Figure 3 is a face view of a part of a stone with the common dress.
Figure 2:
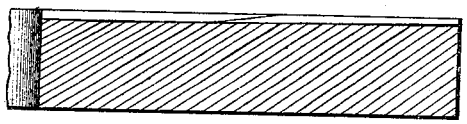
Figure 2 is a section of fig. 1, taken on the line *x x*.
Figure 4:
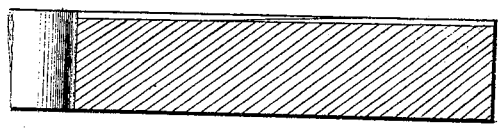
Figure 4 is a section of fig. 3.

This arrangement makes the breast of the stone much more open for ventilation and the grain to be worked in between the stones. It also enables the stone to perform the first breaking down or crushing of the grains much faster than when a part of the surface around the eye is flush, or nearly so, with the other portion of the "lands," as shown at D, fig. 3.

Having thus described our invention,

We claim as new and desire to secure by Letters Patent—

The leading furrows A, diagonal furrows B, and broad furrows E, combined and relatively arranged as and for the purpose described.

WILLIAM G. DUNNIWAY.
HARRISON OSBURN.

Witnesses:
J. C. LITTLE,
NATHAN MULHOLLIN.